(12) United States Patent
Lo

(10) Patent No.: US 7,654,282 B2
(45) Date of Patent: Feb. 2, 2010

(54) EASY-TYPE WATER PRESSURE REDUCING APPARATUS

(75) Inventor: Shun Nan Lo, Changhua Hsien (TW)

(73) Assignee: Yuan Mei Corp., Changhua Hsien (TW)

( * ) Notice: Subject to any disclaimer, the term of this patent is extended or adjusted under 35 U.S.C. 154(b) by 300 days.

(21) Appl. No.: 11/878,161

(22) Filed: Jul. 20, 2007

(65) Prior Publication Data

US 2009/0020169 A1 Jan. 22, 2009

(51) Int. Cl.
*G05D 16/10* (2006.01)
(52) U.S. Cl. .................. 137/505.25; 137/508
(58) Field of Classification Search ........... 137/505.25, 137/505.28, 508
See application file for complete search history.

(56) References Cited

U.S. PATENT DOCUMENTS 2,726,790 A * 12/1955 Woelfer ............. 137/505.25
2,991,797 A * 7/1961 Baldwin ................. 137/508
5,213,132 A * 5/1993 Comment ............. 137/505.25
2002/0088495 A1* 7/2002 Semeia .............. 137/505.25

* cited by examiner

*Primary Examiner*—Stephen Hepperle
(74) *Attorney, Agent, or Firm*—Senniger Powers LLP

(57) ABSTRACT

An easy-type water pressure reducing apparatus comprises a connecting tube having a bore extending through an inlet end and an outlet end. The bore has an annular seat with a smaller-diameter inlet chamber integrally extending at both sides to which a movable element with an inlet port to receive a spring element is mounted. The movable element also includes positioning guide blocks to fit to water-guiding vents of the inlet chamber, and a ringed groove with a sealing ring to abut tight against the inlet chamber, forming a back-and-forth movable positioning space there-between. Therefore, when water pressure at the outlet end is larger than that at the inlet end, water flow blocked by a water plug of the movable element will push the movable element towards the inlet end, compressing the spring element and closing the water-guiding vents gradually to reduce the water flow and stabilize the water pressure thereby.

8 Claims, 7 Drawing Sheets

EASY-TYPE WATER PRESSURE REDUCING APPARATUS

BACKGROUND OF THE INVENTION

The present invention relates to an easy-type water pressure reducing apparatus, comprising a connecting tube having water-guiding vents and oblique guide slopes defining thereon to which a movable element having a positioning space, positioning guide blocks, and a water plug is mounted and flexibly supported by a spring element wherein, depending on the changes of water pressure, the movable element can automatically move back and forth to regulate the amount of water flow and reduce the water pressure thereby, facilitating easy assembly and reducing the cost of materials to fit to economical benefit and boost its competitiveness on the market.

Conventionally, a water-pressure reducing device is mounted between a water inlet end and a water outlet end to regulate the pressure in the transport of water flow and avoid the inconvenience caused by unstable water pressure which can inconsistently emit sudden and large amount of water flow in one second or slow but small amount of water flow in the next one. However, conventional water-pressure devices are characterized by complicated structure, which not only makes difficult assembly but also increases the cost of materials thereby.

SUMMARY OF THE PRESENT INVENTION

It is, therefore, the primary purpose of the present invention to provide an easy-type water pressure reducing apparatus wherein a movable element having both end sides respectively equipped with a positioning space and a water plug is fitted to a connecting tube defined by water-guiding vents, and flexibly supported by the elasticity of a spring element; whereby, depending on the changes of water pressure, the movable element can automatically move back and forth to reduce and stabilize the water pressure, facilitating smooth and stable transport of water flow thereby.

It is, therefore, the second purpose of the present invention to provide an easy-type water pressure reducing apparatus wherein the movable element has positioning guide blocks protruding at one side of the positioning space thereof to fit into the water-guiding vents of the connecting tube, forming a guidance effect as well as preventing the rotation of the movable element flushed by the water flow thereof.

It is, therefore, the third purpose of the present invention to provide an easy-type water pressure reducing apparatus wherein the connecting tube has the water-guiding vents and oblique guide slopes disposed at the interior therein to match to the positioning space, the positioning guide blocks, and the water plug of the movable element which is flexibly supported by the spring element to provide a water-pressure reducing apparatus wherein the movable element can automatically move back and forth according to the changes of the water pressure so as to regulate the amount of the water flow, facilitating easy assembly and reducing the cost of materials to fit to economical benefit and boost its competitiveness on the market.

DETAILED DESCRIPTION OF THE PREFERRED EMBODIMENTS

Figure 1:
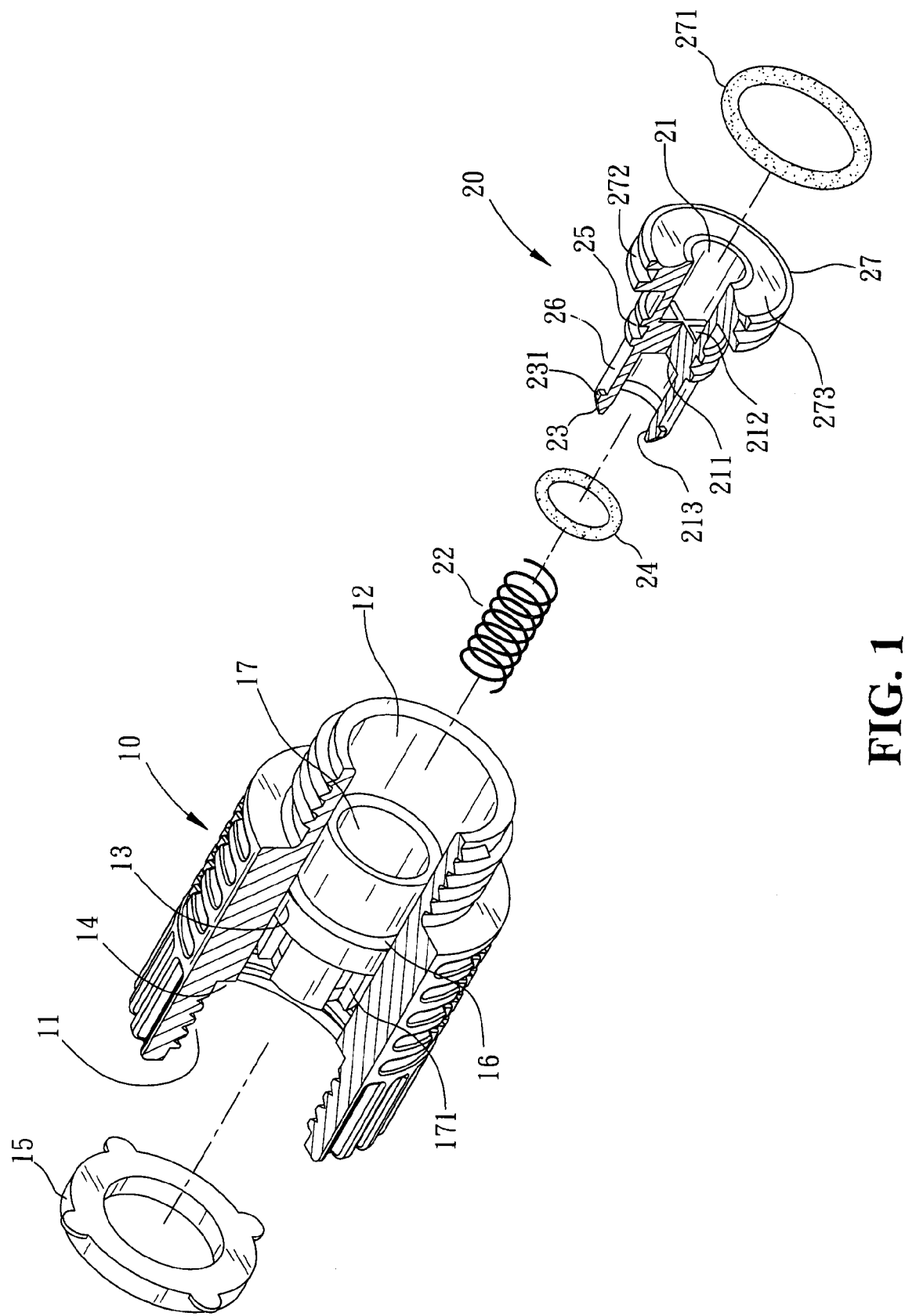
FIG. 1 is an exploded perspective view of the present invention.
Figure 2:
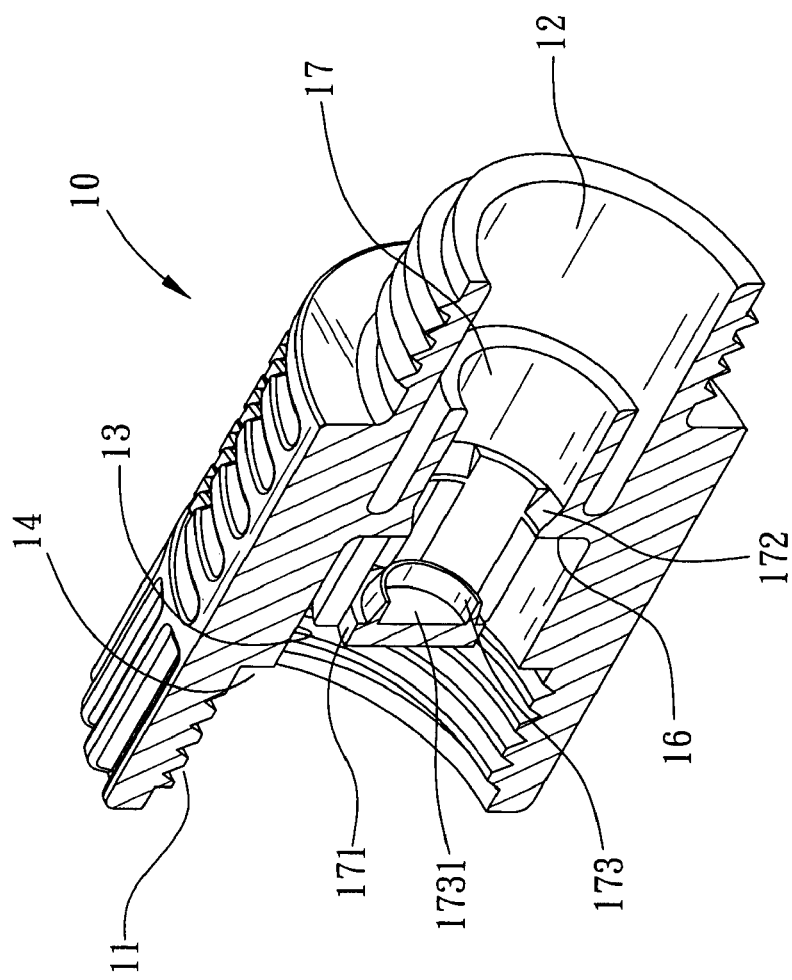
FIG. 2 is a perspective cross sectional view of a connecting tube of the present invention.
Figure 3:
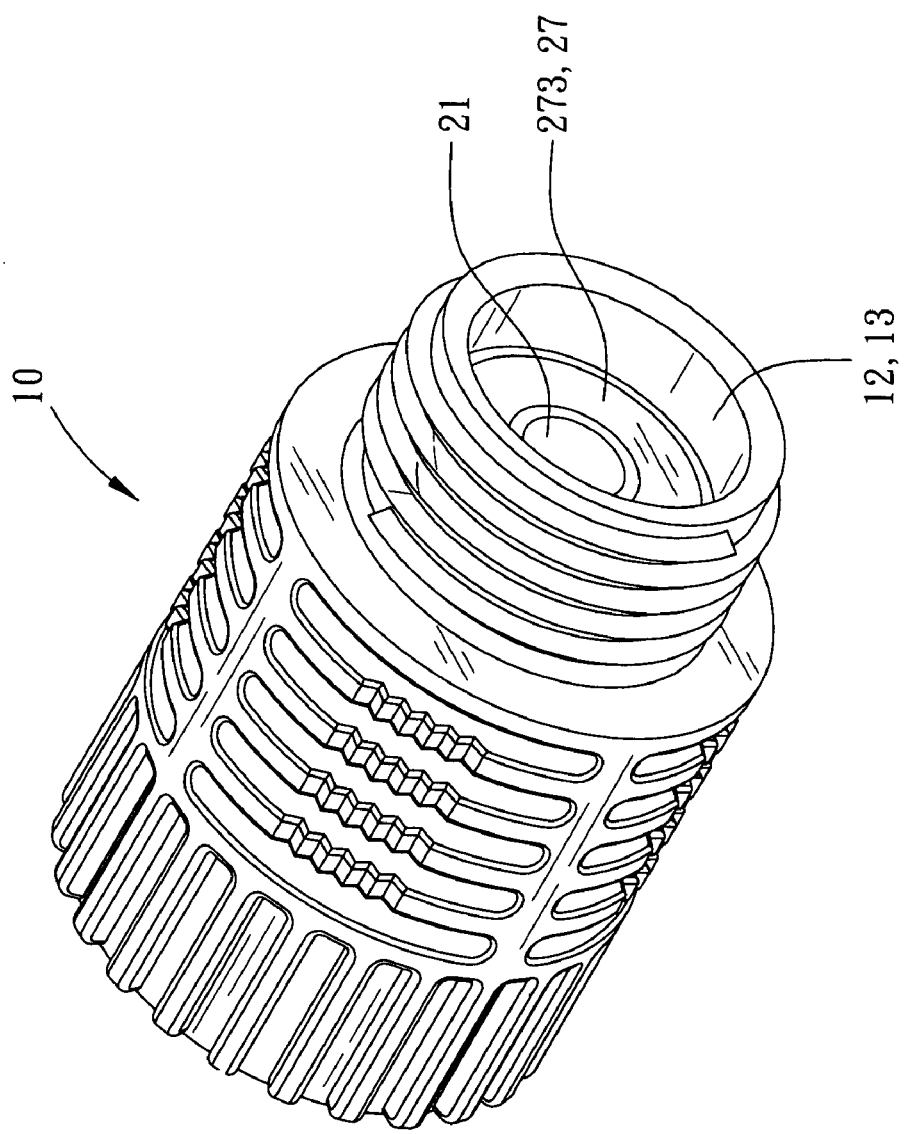
FIG. 3 is an assembled perspective view of the present invention.
Figure 4:
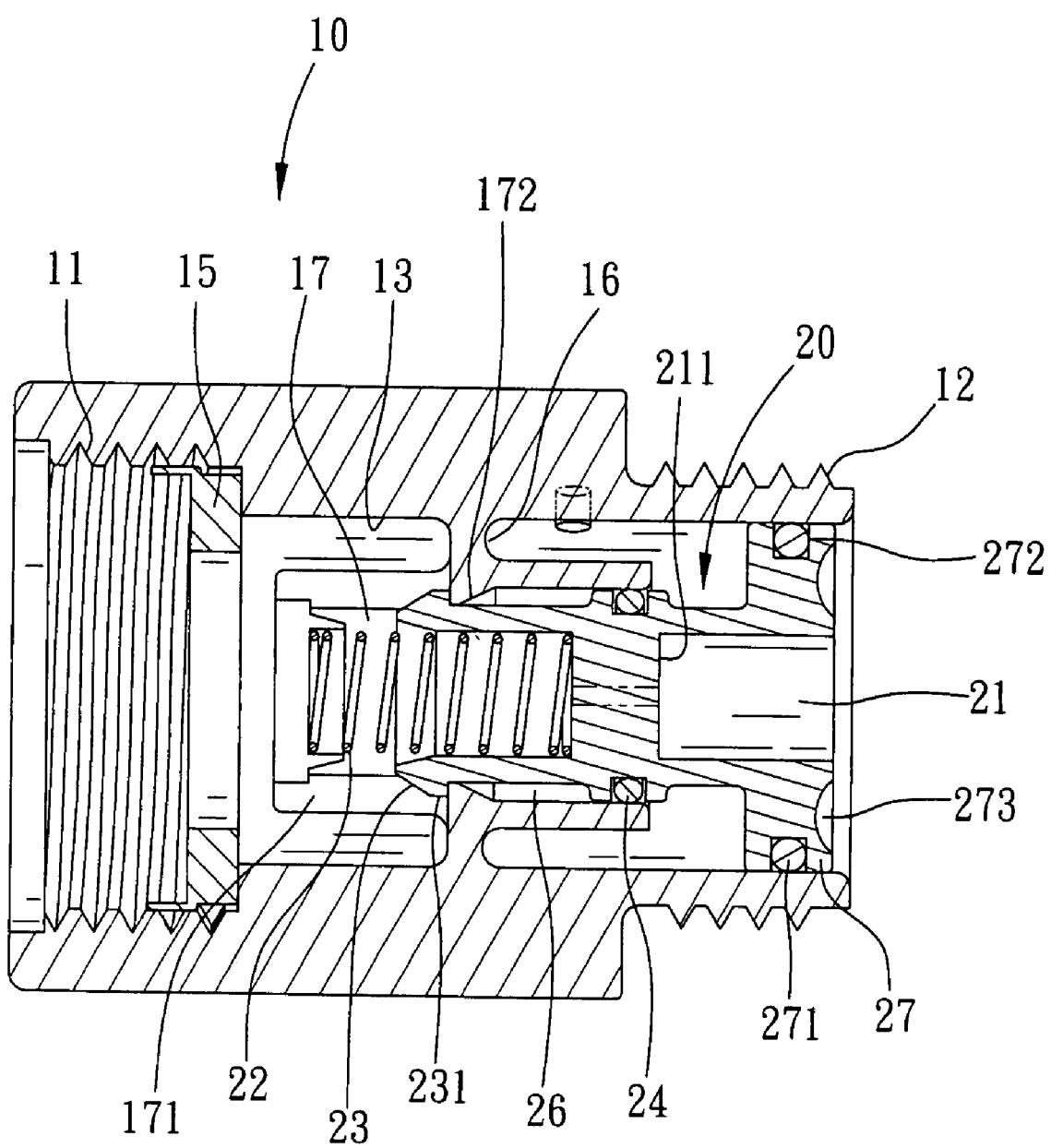
FIG. 4 is an assembled cross sectional view of the present invention.

Please refer to FIG. 1 showing an exploded perspective view of the present invention (accompanied by FIGS. 2 through 4 inclusive). The present invention relates to an easy-type water pressure reducing apparatus, comprising a connecting tube 10 and a movable element 20 wherein the connecting tube 10 has both ends respectively equipped with an internal-threaded inlet end 11 and an external-threaded outlet end 12. The inlet end 11 has a smaller-diameter bore 13 extending there-through to form a stop seat 14 at one side to which a watertight washer 15 is mounted, and a water-inlet pipe (without shown in the diagram) is joined in fluid communication therewith. The bore 13 has an annular seat 16 protruding at the middle section thereon, and a smaller-diameter inlet chamber 17 integrally extending at both sides of the annular seat 16 thereon. The inlet chamber 17 has an opening end positioned at the same side of the outlet end 12 thereof, and the other end having multiple water-guiding vents 171 annularly defining the outer periphery at the same side of the inlet end 11 thereof. The inlet chamber 17 also has oblique guide slopes 172 defining the internal surface of the middle section thereon. The movable element 20 has an inlet port 21 drilled at the center there-through, and a middle section equipped with a crosswise stop block 211 defined by multiple orifices 212 thereon to fluidly connect to the inlet port 21 thereof. A spring element 22 is accommodated to one side of the inlet port 21 and precisely restricted by the stop block 211 thereof. The movable element 20 has one end edge defined by an obliquely-cut guide surface 23 and multiple positioning guide blocks 231 annularly arranged at the outer periphery thereon, which can be smoothly slid along the oblique guide slopes 172 of the inlet chamber 17 and forced therein so that the positioning guide blocks 231 are allowed to precisely fit into the water-guiding vents 171 respectively. Thus, the spring element 22 can abut against the bottom surface of the inlet chamber 17 and push the movable element 20 towards the outlet end 12, permitting the water-guiding vents 171 to fluidly connect to the inlet port 21 thereby. The middle section of the movable element 20 has a ringed groove 25 defining thereon for the accommodation of a sealing ring 24 thereto to abut tight against the internal surface of the inlet chamber 17 and form a back-and-forth movable positioning space 26 between the sealing ring 24 and the positioning guide blocks 231. The movable element 20 also has the other end equipped with a larger-diameter water plug 27 to seal tight onto the internal surface of the outlet end 12 thereby. The water plug 27 has an annular groove 272 indented thereon for the mounting of a watertight ring 271 thereto, and an arcuate grooved area 273 depressed at the end surface thereon. The connecting tube 10 also has a through hole drilled at the outer periphery thereon to communicate with the bore 13 at the side of the annular seat 16 having the outlet end 12 extending thereon.

Figure 5:
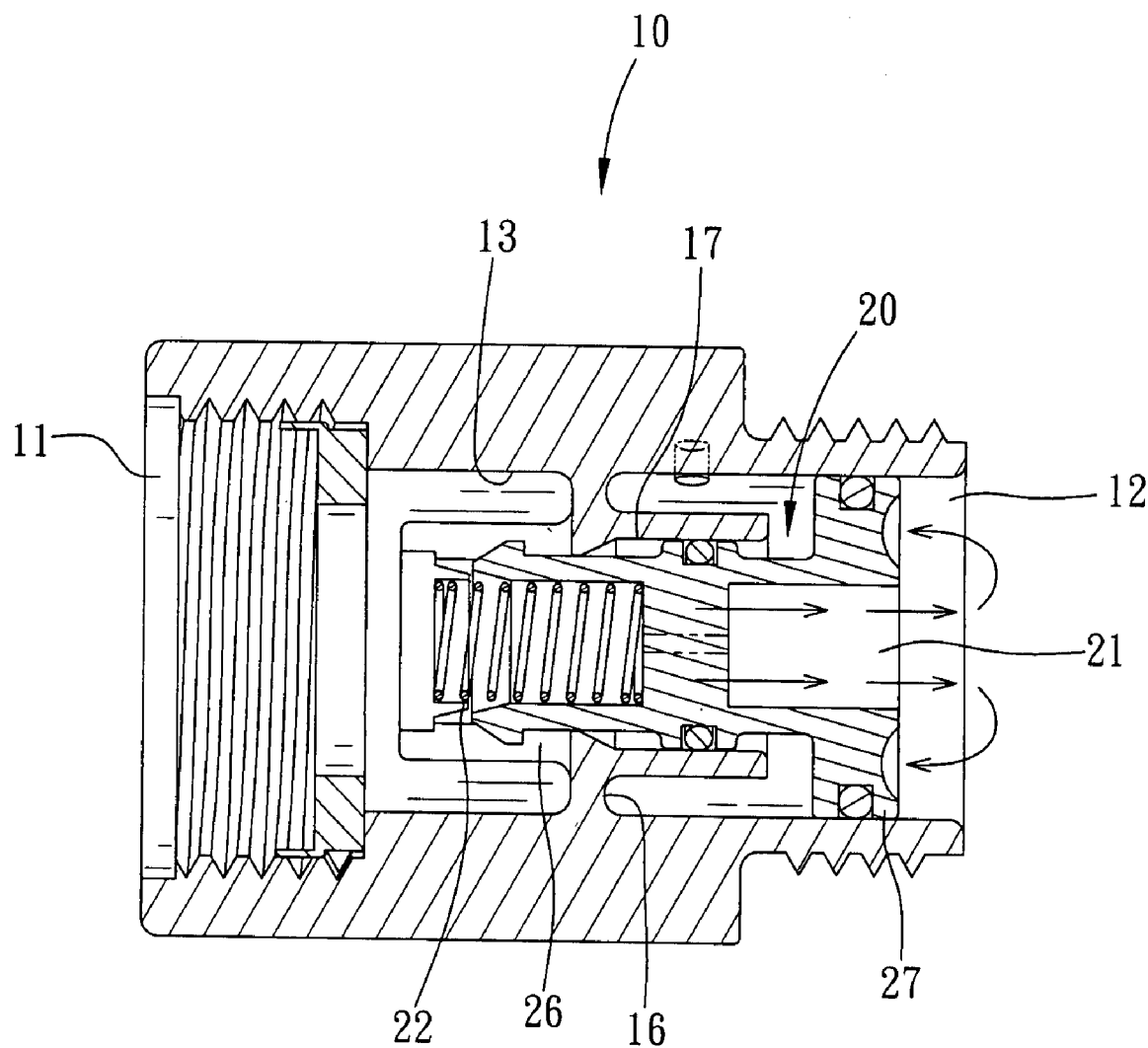
FIG. 5 is a diagram showing a movable element of the present invention pushed by the reflux of water flow to move towards an inlet end of the connecting tube so as to narrow down water-guiding vents and reduce the water pressure thereby.
Figure 6:
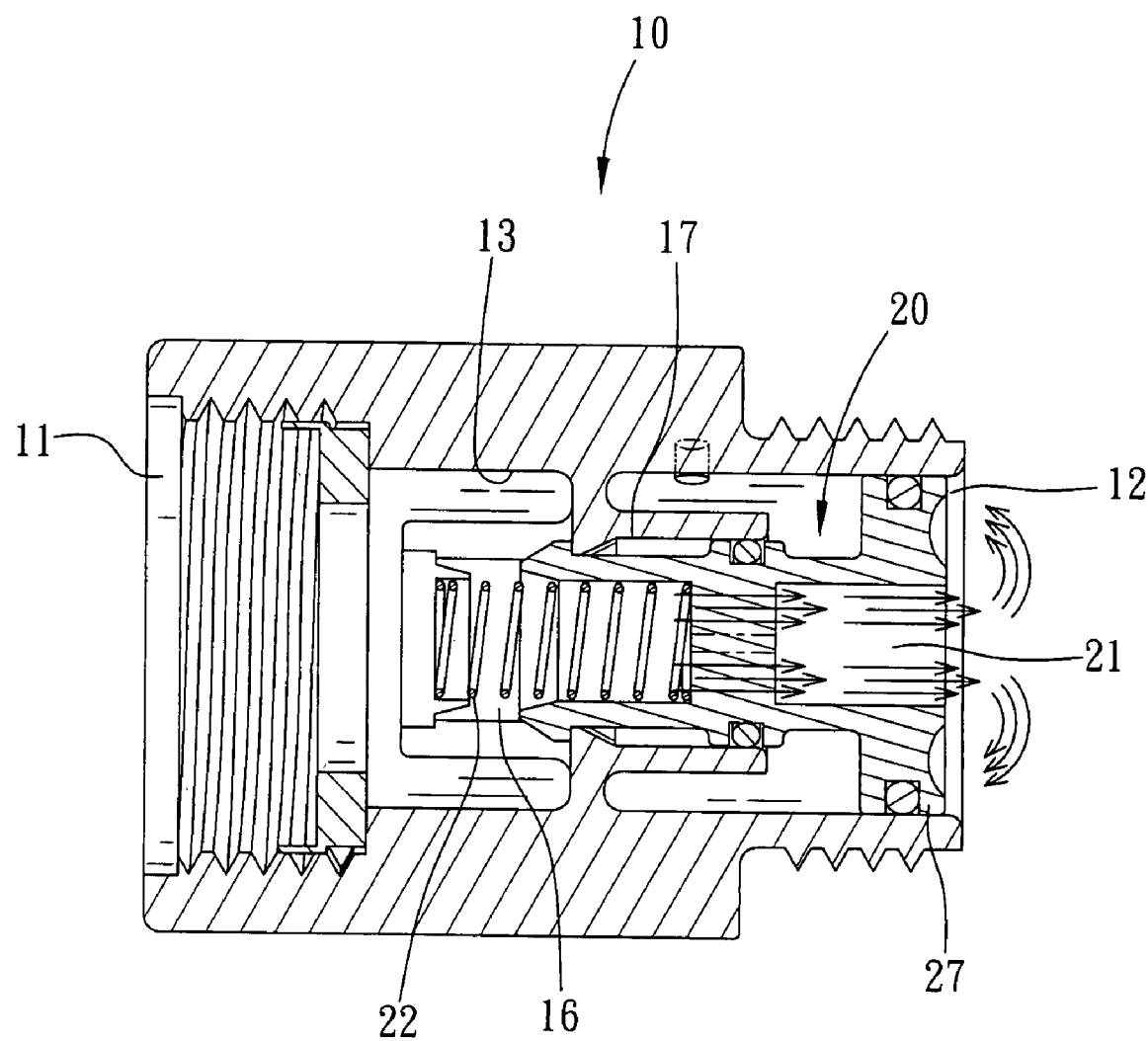
FIG. 6 is another diagram showing the movable element thereof pushed by the reflux of the water flow to move towards the inlet end of the connecting tube so as to reduce the water-guiding vents thereof and stabilize the water pressure thereby.

Please refer to FIGS. 5, 6. When water flow comes through the inlet end 11 of the connecting tube 10 to enter the bore 13, the annular seat 16 and the inlet chamber 17 are utilized to block the water flow which will, then, flush through each water-guiding vent 171 of the inlet chamber 17 to enter the inlet port 21 of the movable element 20 and the orifices 212 of the stop block 21 before flowing out of the outlet end 12 to be transported outwards thereby. Meanwhile, the back-and-forth movable positioning space 26 formed between the sealing ring 24 and the positioning guide blocks 231 of the movable element 20 is matched to the water-guiding vents 171 of the connecting tube 10 and flexibly supported by the elasticity of the spring element 22 thereof. When the water pressure at the outlet end 12 is larger than that at the inlet end 11, the water flow stopped by the water plug 27 will flush backwards along the arcuate grooved area 273 to generate a pushing force, pressing the movable element 20 towards the inlet end 11 and compressing the spring element 22 therewith. Then, the water-guiding vents 171 blocked by the movable element 20 will gradually close up and become smaller and smaller so as to cut down the influx of the water flow and, thus, achieve the purpose of reducing and stabilizing the water pressure thereby. However, when the water pressure at the inlet end 11 is larger than that at the outlet end 12, the spring element 22 via its elasticity will push the positioning guide blocks 231 of the movable element 20 to slide along the water-guiding vents 171 and bounce the positioning space 26 thereof towards the outlet end 12 to return to the former position. Therefore, depending on the changes of water pressure, the movable element 20 can automatically move back and forth to reduce and stabilize the pressure thereof so that the water flow can be transported outwards in stable flux, achieving the best state of application thereby.

Figure 7:
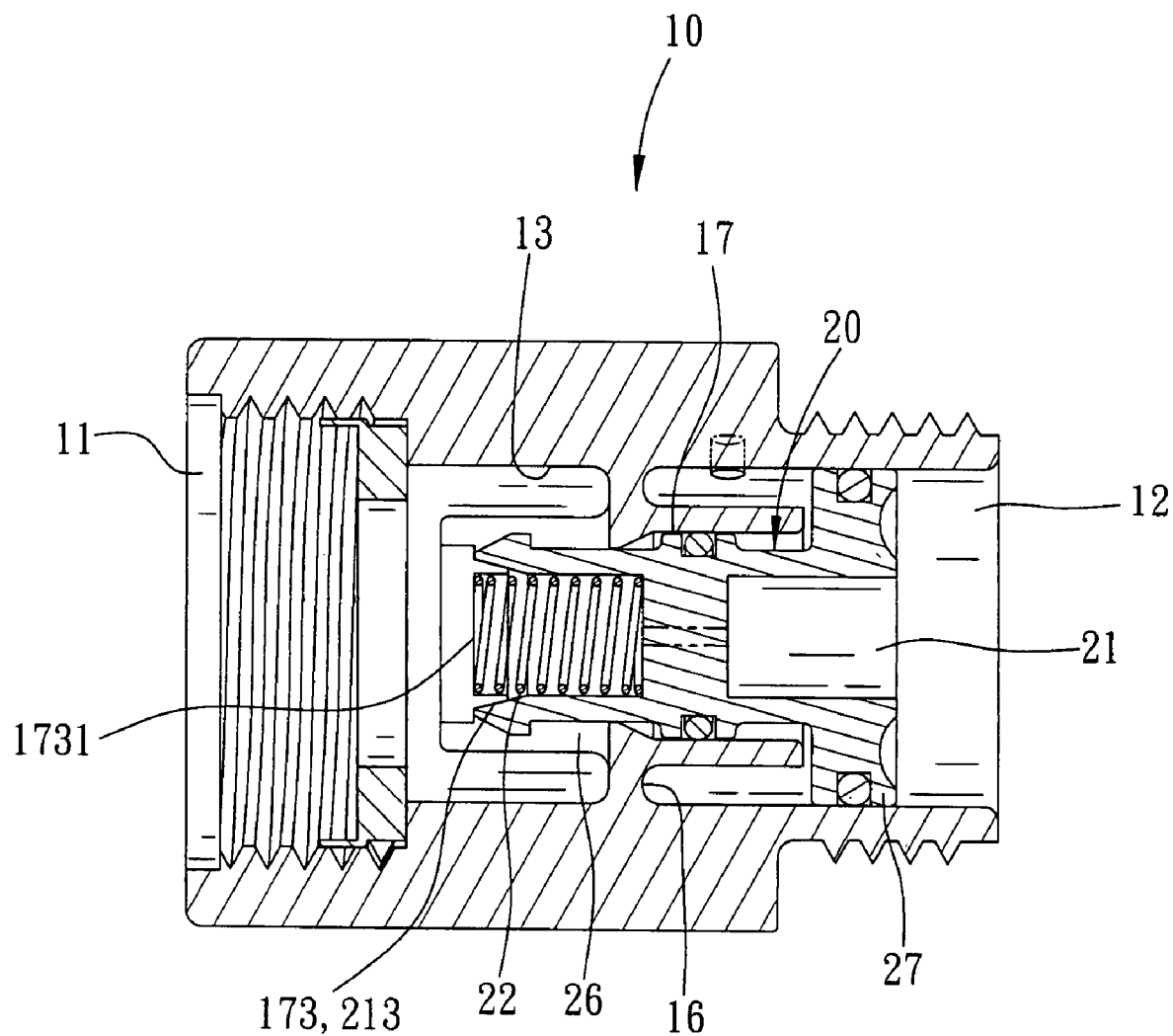
FIG. 7 is a diagram showing the movable element pushed by the reflux of the water flow to move towards the inlet end of the connecting tube and completely block up the water-guiding vents in the process of reducing water pressure thereby.

Moreover, the inlet chamber 17 of the connecting tube 10 is equipped with a bottom surface 1731 having a conically-tapered abutment portion 173 protruding thereon. The inlet port 21 of the movable element 20 also has the counterpart internal surface of the guide surface 23 defined by an annularly-oblique abutment surface 213 thereon. When the water plug 27 is pushed by the reflux of strong water pressure, the movable element 20 will slide along the internal surface of the bore 13 till the abutment surface 213 gradually closes onto the abutment portion 173 as shown in FIG. 7, which synchronically works with the reflux of the water pressure to form a sufficient force compressing the spring element 22 thereby. Thus, the positioning space 26 can accurately block up the water-guiding vents 171 to reduce the transport of the water flow and achieve speedy pressure-reducing purpose thereby. However, when the water pressure at the outlet end 12 is lower than the elasticity of the spring element 22, the movable element 20 will be bounced by the spring element 22 to slide along the bore 13 towards the outlet end 12 thereof.

What is claimed is:

1. An easy-type water pressure reducing apparatus, comprising a connecting tube and a movable element wherein the connecting tube has both ends respectively equipped with an inlet end and an outlet end with a bore extending therethrough; the bore has an annular seat protruding at the middle section thereon, and a smaller-diameter inlet chamber integrally extending at both sides of the annular seat thereon; the inlet chamber having oblique guide slopes defining the internal surface of the middle section can accommodate the movable element defined by an inlet port and having a spring element received therein; the inlet chamber of the connecting tube also has water-guiding vents cut thereon at the same side of the inlet end thereof, and the inlet port of the movable element has a stop block extending therein to restrict the position of the spring element thereby; the movable element also includes positioning guide blocks extending at one end edge thereon to fit into the water-guiding vents thereby, and a ringed groove with a sealing ring mounted thereto to abut tight against the internal surface of the inlet chamber, forming a back-and-forth movable positioning space there-between; the movable element has a larger-diameter water plug with a waterproof ring mounted thereto extending at the other end thereon to abut tight against the internal surface of the outlet end of the connecting tube thereby; whereby, the movable element can be pushed by the elasticity of the spring element to move towards the outlet end thereof; when the water pressure at the outlet end is larger than that at the inlet end thereof, water flow will be blocked by the water plug to generate a flushing force, pushing the movable element towards the inlet end and compressing the spring element therewith so that the water-guiding vents blocked by the movable element will gradually close up and become smaller and smaller so as to cut down the influx of the water flow and achieve the purpose of reducing and stabilizing water pressure thereby.

2. The easy-type water pressure reducing apparatus as claimed in claim 1 wherein the inlet end of the connecting tube is defined by internal screw threads, while the outlet end thereof is defined by external screw threads thereof.

3. The easy-type water pressure reducing apparatus as claimed in claim 1 wherein the water plug of the movable element has an annular groove defining thereon to which a waterproof ring is mounted.

4. The easy-type water pressure reducing apparatus as claimed in claim 1 wherein the water plug thereof has the end surface defined by an arcuate grooved area.

5. The easy-type water pressure reducing apparatus as claimed in claim 1 wherein the conjoining edge of the bore and the inlet end of the connecting tube has a stop seat extending thereon, to which a watertight washer is mounted.

6. The easy-type water pressure reducing apparatus as claimed in claim 1 wherein the stop block of the movable element is molded in crosswise configuration with multiple orifices extending there-through to fluidly communicate with the inlet port thereof.

7. The easy-type water pressure reducing apparatus as claimed in claim 1 wherein the movable element has one end edge defined by an oblique guide surface extending along the positioning guide blocks thereon.

8. The easy-type water pressure reducing apparatus as claimed in claim 1 wherein the inlet chamber of the connecting tube is equipped with a bottom surface having a conically-tapered abutment portion protruding thereon, and the inlet port of the movable element also has the internal surface of the guide surface defined by an annularly-oblique abutment surface thereon so that, when the water plug is pushed by the reflux of strong water pressure, the abutment surface can gradually close onto the abutment portion and synchronically work with the reflux of the water pressure to form a sufficient force compressing the spring element thereby; when the water pressure at the outlet end is lower than the elasticity of the spring element, the movable element will be bounced by the spring element to slide along the bore towards the outlet end thereof.

* * * * *